US005703285A

United States Patent [19]

Shimizu et al.

[11] Patent Number: 5,703,285

[45] Date of Patent: Dec. 30, 1997

[54] DIAGNOSIS APPARATUS AND METHOD FOR AN EXHAUST GAS RECIRCULATION UNIT OF AN INTERNAL COMBUSTION ENGINE

[75] Inventors: Hirokazu Shimizu; Kenichi Machida, both of Atsugi, Japan

[73] Assignee: Unisia Jecs Corporation, Kanagawa-ken, Japan

[21] Appl. No.: 674,415

[22] Filed: Jul. 2, 1996

[30] Foreign Application Priority Data

Jul. 10, 1995 [JP] Japan .................................... 7-173519

[51] Int. Cl.[6] .......................... F02M 25/07; G01M 15/00

[52] U.S. Cl. .......................... 73/118.1; 73/115; 73/117.3; 340/439; 364/431.061

[58] Field of Search .......................... 73/115, 116, 117.2, 73/117.3, 118.1, 118.2; 364/431.04, 431.05, 431.06, 431.061; 340/439, 451; 123/571

[56] References Cited

U.S. PATENT DOCUMENTS

| | | | |
|---|---|---|---|
| 4,556,030 | 12/1985 | Aono | 73/116 |
| 4,621,603 | 11/1986 | Matekunas | 73/116 |
| 4,665,689 | 5/1987 | Rognon | 73/115 |
| 4,671,107 | 6/1987 | Chiesa et al. | 73/118.2 |
| 5,103,655 | 4/1992 | Kano et al. | 73/118.1 |
| 5,190,017 | 3/1993 | Cullen et al. | 73/117.3 |
| 5,207,093 | 5/1993 | Maeda | 73/118.1 |
| 5,349,936 | 9/1994 | Uchinami | 73/117.3 |
| 5,368,005 | 11/1994 | Kako | 73/117.3 |
| 5,474,051 | 12/1995 | Matsumoto et al. | 73/118.1 |
| 5,488,938 | 2/1996 | Ohuchi | 73/117.3 |
| 5,513,616 | 5/1996 | Matsumoto et al. | 73/118.1 |
| 5,540,091 | 7/1996 | Nakagawa | 73/117.3 |
| 5,542,400 | 8/1996 | Matsumoto et al. | 73/117.3 |

FOREIGN PATENT DOCUMENTS

| | | |
|---|---|---|
| 63-17432 | 2/1988 | Japan . |
| 6-288303 | 10/1994 | Japan . |

*Primary Examiner*—George M. Dombroske
*Attorney, Agent, or Firm*—Lowe, Price, LeBlanc & Becker

[57] ABSTRACT

A difference is obtained between a cylinder pressure during the compression stroke when an exhaust gas recirculation control valve is opened, and a cylinder pressure during the compression stroke when the exhaust gas recirculation control valve is closed. An estimated value for this difference is set from a cylinder pressure detected under the closed conditions and an exhaust gas recirculation proportion. When the difference is smaller than the estimated value, it is assumed that the exhaust gas recirculation quantity is not changing in accordance with open/close control, and the occurrence of a fault in the exhaust gas recirculation unit is thus judged.

20 Claims, 5 Drawing Sheets

DIAGNOSIS APPARATUS AND METHOD FOR AN EXHAUST GAS RECIRCULATION UNIT OF AN INTERNAL COMBUSTION ENGINE

FIELD OF THE INVENTION

The present invention relates to technology for diagnosing faults in an exhaust gas recirculation unit of an internal combustion engine, wherein a portion of the exhaust gas is recirculated back to an intake system.

DESCRIPTION OF THE RELATED ART

Heretofore, as an apparatus for reducing NOx in the exhaust gas of an automotive internal combustion engine, there is known an exhaust gas recirculation unit which recirculates a portion of the exhaust gas back to an intake manifold to thereby lower the combustion temperature and hence reduce NOx production.

If due to a fault in the exhaust gas recirculation unit, however, the expected exhaust gas recirculation cannot be carried out, then the quantity of NOx in the exhaust gas will increase. It is therefore necessary to diagnose faults in the exhaust gas recirculation unit.

As a technique for such fault diagnosis, there is a method wherein the presence or absence of faults is diagnosed based on changes in combustion pressure when an exhaust gas recirculation control valve is forcibly opened and closed (refer to Japanese Unexamined Patent Publication No. 6-288303).

With this diagnostic method, however, since the combustion pressure fluctuates irrespective of the exhaust gas recirculation, combustion pressure differences due to the presence or absence of exhaust gas recirculation cannot be judged to a high accuracy, making it difficult to stably maintain a high diagnostic accuracy.

SUMMARY OF THE INVENTION

The present invention takes into consideration the above problems, with the object of providing a diagnosis apparatus and method which can diagnose faults in an exhaust gas recirculation unit based on cylinder pressure detection value, without being influenced by combustion fluctuations.

Moreover, it is an object to provide a diagnosis apparatus and method which can diagnose faults to a high accuracy while avoiding influence from combustion fluctuations, and without being influenced for example by shifts in the detection signal from the cylinder pressure sensor.

To achieve the above objectives, the diagnosis apparatus and method according to the present invention for an exhaust gas recirculation unit of an internal combustion engine includes: sampling the cylinder pressure detected by a cylinder pressure sensor in a preset sampling timing during a compression stroke; and carrying out fault diagnosis of the exhaust gas recirculation unit based on the sampled cylinder pressure, and an open/close condition of an exhaust gas recirculation control valve for when the cylinder pressure was sampled.

Since the cylinder pressure in the compression stroke before combustion differs depending on the charge gas quantity in the cylinder (including the recirculated exhaust gas), increasing with the increase in charge gas quantity when exhaust gas recirculation is carried out, then the actual exhaust gas recirculation condition can be estimated based on whether or not the cylinder pressure sampled during the compression stroke is a value corresponding to the open/ close condition of the exhaust gas recirculation control valve. Furthermore, by carrying out diagnosis based on the cylinder pressure during the compression stroke before combustion, fault diagnosis of the exhaust gas recirculation unit can be carried out without being influenced by combustion fluctuations.

Preferably, diagnosis is carried out based on a difference between a cylinder pressure sampled with the exhaust gas recirculation control valve open, and a cylinder pressure sampled with the exhaust gas recirculation control valve closed.

If the exhaust gas recirculation quantity actually changes in accordance with the opening and closing of the exhaust gas recirculation control valve, then a cylinder pressure change corresponding to this change should be produced. Hence if there is no change in cylinder pressure in spite of a change in the open/close condition of the exhaust gas recirculation control valve (or if the difference is smaller than a value obtained under normal conditions), a fault in the exhaust gas recirculation unit can be assumed. Moreover, if diagnosis is based on the difference, then diagnosis accuracy can be maintained even with a shift in the detection signal from the cylinder pressure sensor, due for example to deterioration of the cylinder pressure sensor.

Preferably an average value of the difference is computed, and fault diagnosis of the exhaust gas recirculation unit is carried out based on the average value.

By computing the average value of differences obtained over several cycles, then erroneous diagnosis based on an abnormal transitory difference can be avoided.

Moreover, a dead zone for fault judgment may be changed according to the number of difference data used during computation of the average value of the differences.

That is to say, since the reliability of the average value is increased when the number of difference data is larger, then changing the dead zone for fault judgment based on the number of data, enables the presence or absence of a fault to be judged to a high accuracy when the number of data number is large, while avoiding erroneous diagnosis based on an average value computed for a small number of data.

Moreover, the construction may include; setting an estimation value for the difference based on an exhaust gas recirculation proportion and the sampled cylinder pressure, and judging a fault in the exhaust gas recirculation unit when the difference is equal to or less than the estimation value.

The change in cylinder pressure during the compression stroke due to the presence or absence of exhaust gas recirculation varies depending on operating conditions, and the exhaust gas recirculation proportion. Therefore estimating this cylinder pressure change, and judging if a change corresponding to this estimation has actually been produced enables diagnosis accuracy to be stably maintained.

Here the cylinder pressure may be sampled within a range from 30° BTDC~20° BTDC.

By sampling the cylinder pressure within this crank angle range, differences in cylinder pressure due to the exhaust gas recirculation quantity before combustion can be precisely detected.

Preferably, an average value or an integral value of the cylinder pressure sampled in a pre-set crank angle range during the compression stroke is computed, and the diagnosis carried out based on the average value or the integral value of the cylinder pressure.

With such a construction, any drop in diagnosis accuracy due to noise superimposed on the detection signal from the cylinder pressure sensor can be prevented.

Other objects and aspects of the present invention will become apparent from the following description of embodiment given in conjunction with the appended drawings.

DESCRIPTION OF THE PREFERRED EMBODIMENT

Figure 1:
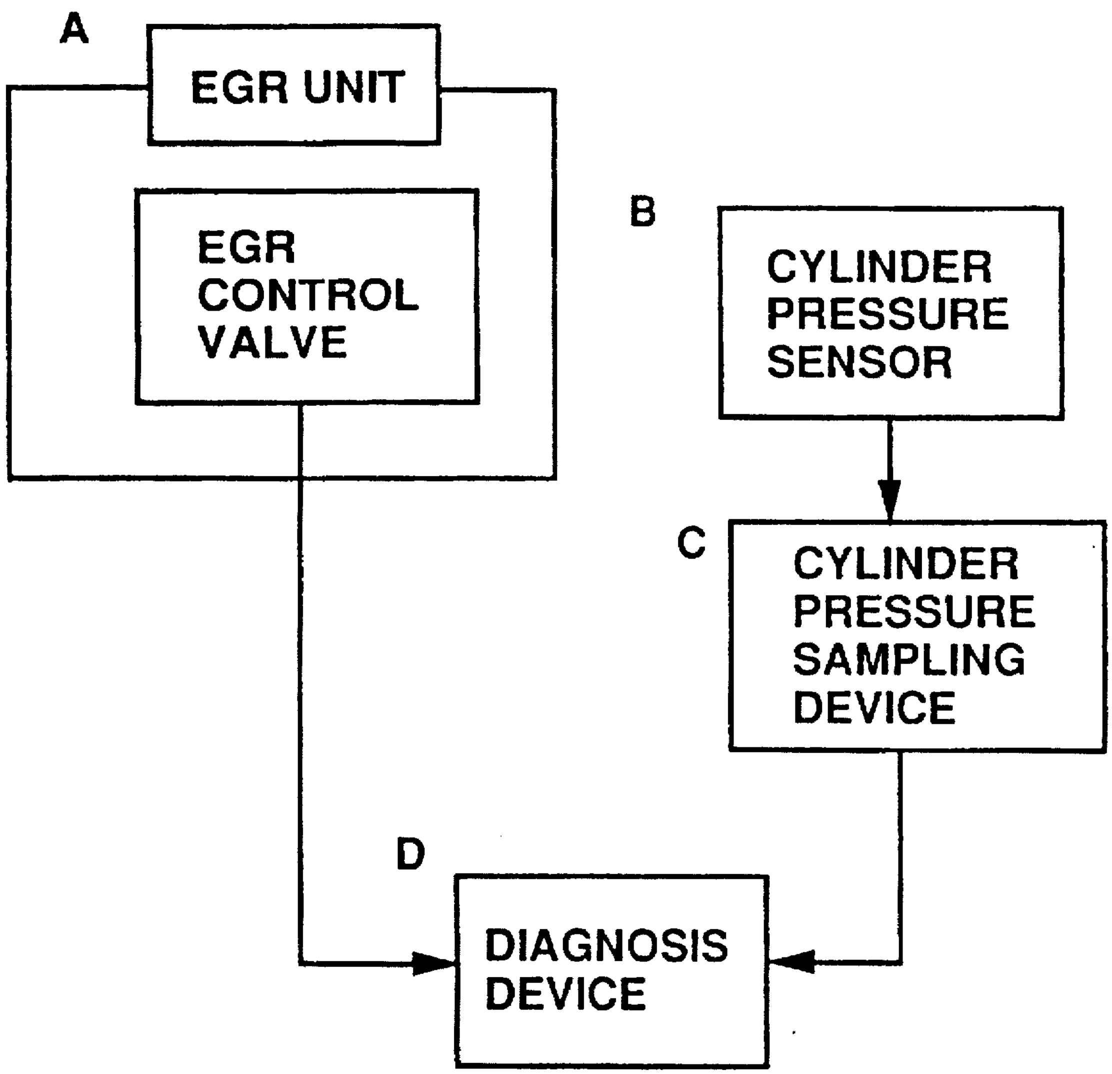
FIG. 1 is a block diagram of a basic configuration of a diagnosis apparatus according to the present invention.

FIG. 1 is a block diagram showing a basic configuration of a fault diagnosis apparatus according to the present invention. In FIG. 1 an exhaust gas recirculation unit A is constructed such that a portion of the exhaust gas is recirculated back to an intake system via an exhaust gas recirculation passage in which is disposed an exhaust gas recirculation control valve, to thereby reduce NOx in the exhaust gas.

A cylinder pressure sensor B is provided for detecting a cylinder pressure of an engine. Detection results from the cylinder pressure sensor B are sampled by a cylinder pressure sampling device C in a pre-set sampling timing (for example 30° BTDC~20° BTDC) during a compression stroke.

A diagnosis apparatus D diagnoses the presence or absence of a fault in the exhaust gas recirculation unit A by judging whether or not a sampled cylinder pressure shows a value corresponding to exhaust gas recirculation control conditions, based on the cylinder pressure sampled by the cylinder pressure sampling device C, and the open/close condition of the exhaust gas recirculation control valve when the cylinder pressure was sampled, and then outputs a diagnosis signal corresponding to the diagnosis result.

Following is a description of an embodiment of a diagnosis apparatus having the abovementioned basic configuration, together with a diagnosis method therefor.

Figure 2:
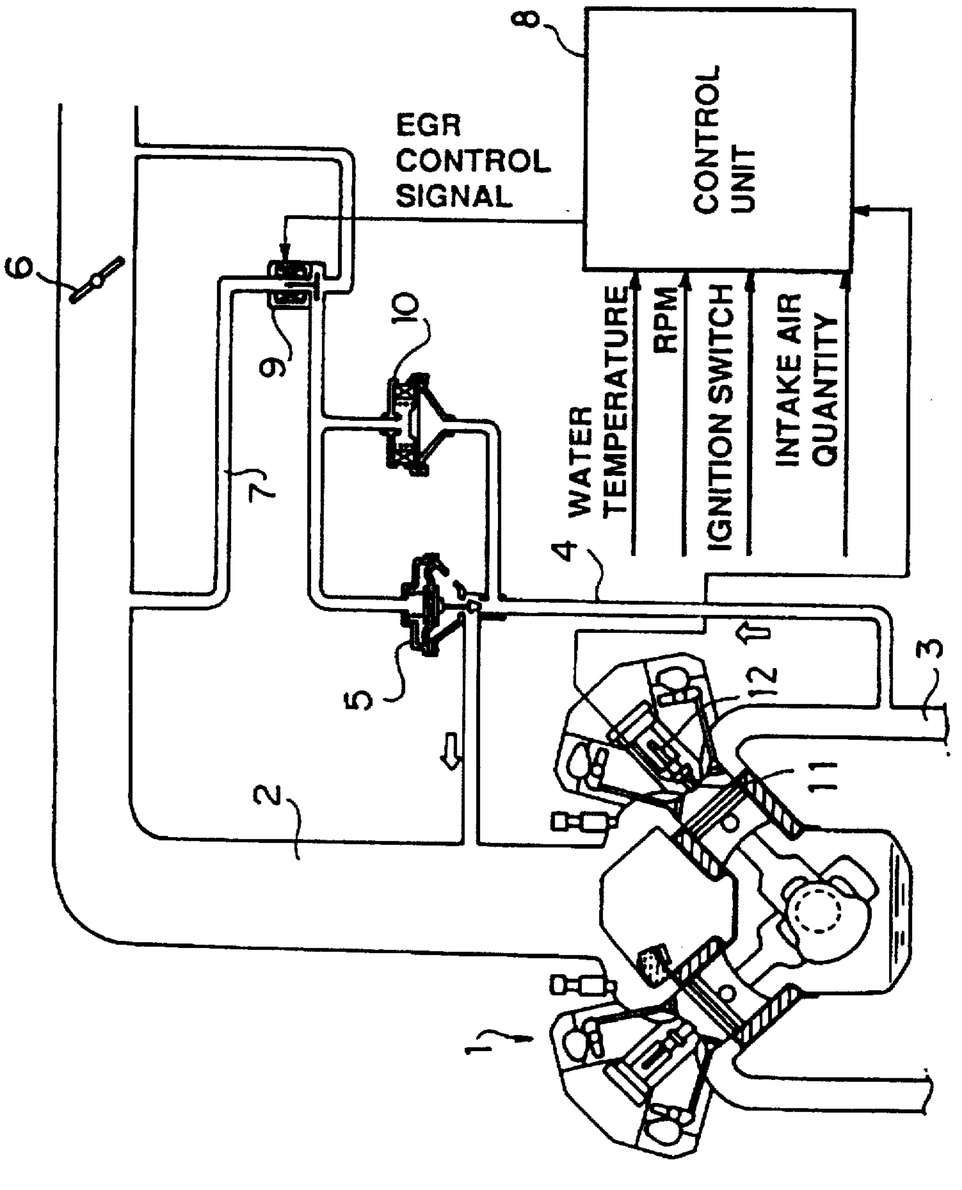
FIG. 2 is a schematic system diagram showing an internal combustion engine of an embodiment of the present invention.

In FIG. 2 showing a system structure of the embodiment, an exhaust gas recirculation passage 4 is provided so as to communicate between an exhaust manifold 3 and an intake manifold 2 of an engine 1, and is opened and closed by means of an EGR control valve 5 (exhaust gas recirculation control valve).

The EGR control valve 5 is a diaphragm type valve which is opened by the action of a negative intake pressure of the engine against a biasing force of a coil spring acting in a valve close direction. A negative pressure passage 7 is provided communicating between a pressure chamber of the EGR control valve 5 and the intake manifold 2 downstream of a throttle valve 6. A negative intake pressure of the engine 1 is introduced to the pressure chamber via the negative pressure passage 7 to thereby open the valve 5.

An EGR control solenoid 9 which is on/off controlled by a control unit 8, is disposed in the negative pressure passage 7. The opening/closing of the EGR control valve 5, that is, the on/off of the exhaust gas recirculation is controlled by open/close control of the EGR control solenoid 9.

Numeral 10 indicates a diaphragm type BPT (back pressure transducer) valve in which a diaphragm is operated by exhaust pressure and negative manifold pressure to thereby set a negative pressure for controlling the EGR control valve 5.

Detection signals such as for cooling water temperature, engine rotational speed, and intake air quantity, from respective sensors, together with an on/off signal of an ignition switch, are input to the control unit 8, which then switches the EGR control solenoid 9 on and off based on engine operating conditions judged from these signals.

Also input to the control unit 8 are cylinder pressure detection signals from a cylinder pressure sensor 11. The cylinder pressure sensor 11 is a ring shape sensor comprising a piezoelectric element, such as disclosed in Japanese Unexamined Utility Model Publication No. 63-17432, which is fitted as a washer to an ignition plug 12 and outputs a signal corresponding to the cylinder pressure as a result of the cylinder pressure acting on and lifting the ignition plug 12 so that a set loading changes.

However, instead of this type of sensor fitted as a washer for the ignition plug 12, a type wherein the sensor portion faces directly into the combustion chamber to detect the cylinder pressure as an absolute pressure may be used.

Figure 3:
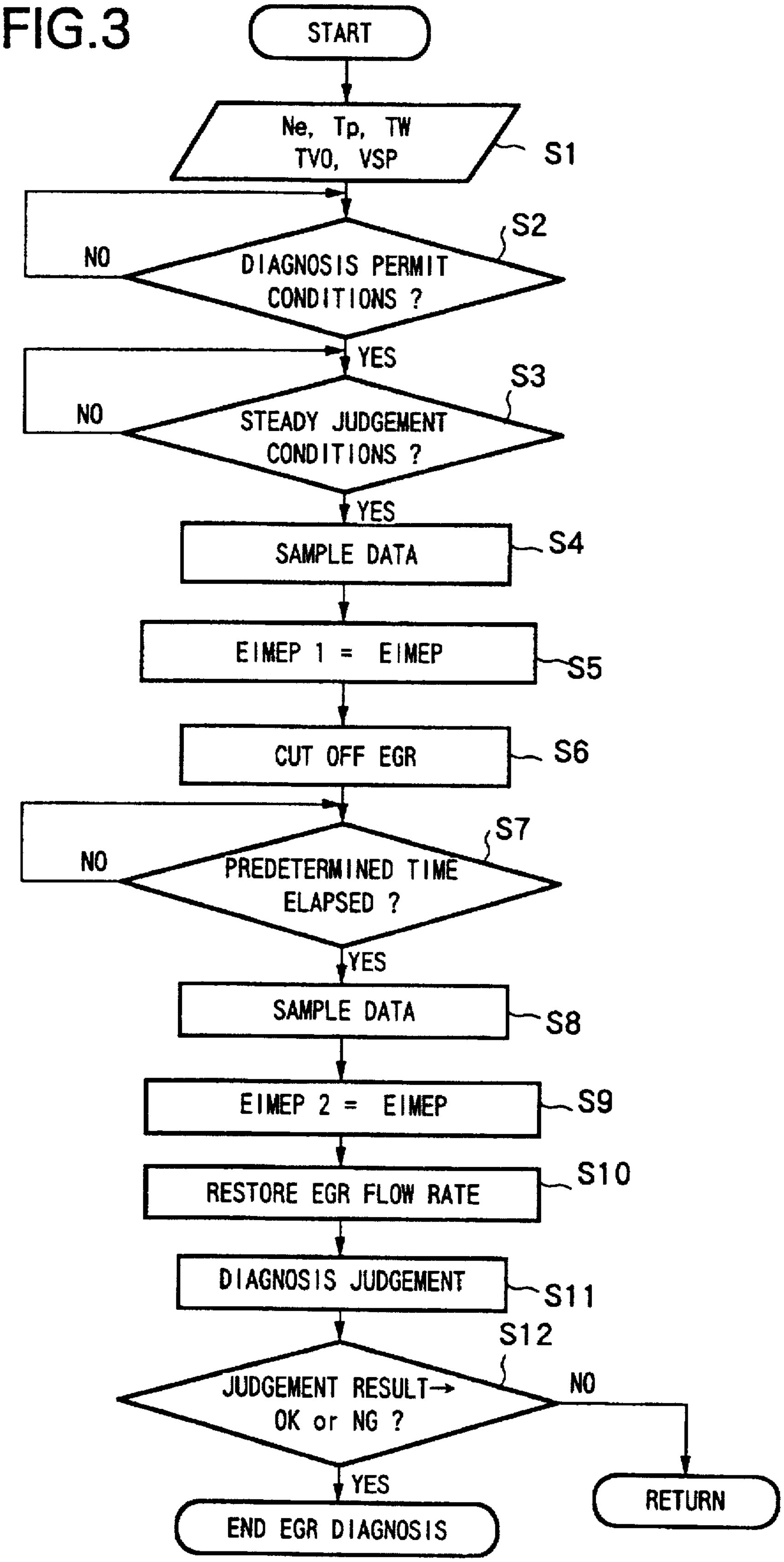
FIG. 3 is a flow chart showing a main fault diagnosis routine of the embodiment.
Figure 4:
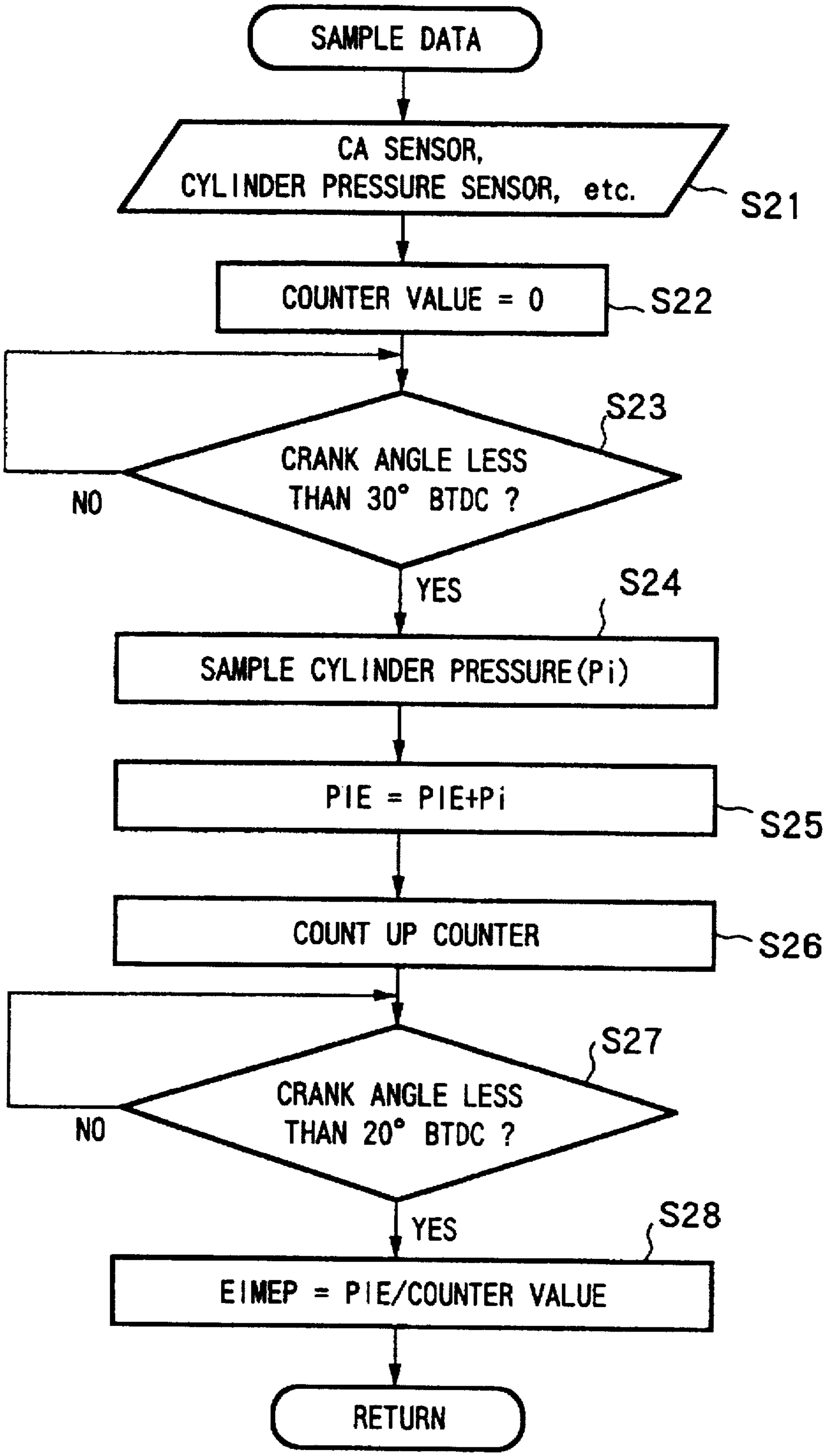
FIG. 4 is a flow chart showing aspects of a cylinder pressure sampling routine of the embodiment.
Figure 5:
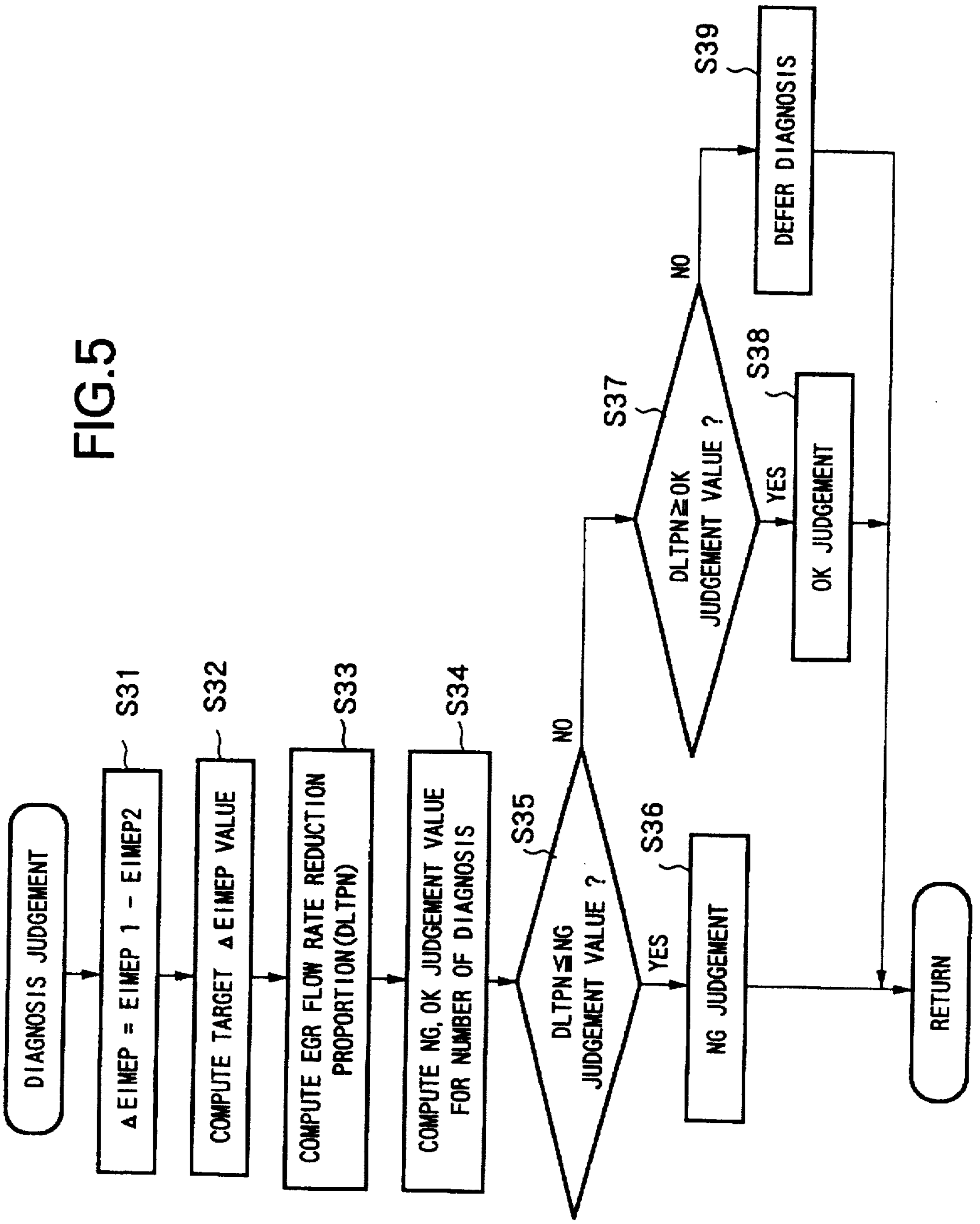
FIG. 5 is a flow chart showing aspects of a fault diagnosis routine using cylinder pressure in the embodiment.

The control unit 8 has a function of carrying out diagnosis of the exhaust gas recirculation unit of the above construction, as shown in the flow charts of FIG. 3–FIG. 5, based on the cylinder pressure detected by the cylinder pressure sensor 11.

With the present embodiment, the functions of the diagnosis device and the cylinder pressure sampling device are realized by software illustrated by the flow charts of FIG. 3 –FIG. 5, and stored in the control unit 8.

In the flow chart of FIG. 3, showing the main diagnosis control routine of the embodiment, initially in step 1 (with "step" denoted by S in the figures), information such as engine rotational speed Ne, basic fuel injection quantity Tp, cooling water temperature TW, throttle valve opening TVO, and vehicle speed VSP, is read.

The basic fuel injection quantity Tp is a fuel quantity computed by the control unit 8 as a value proportional to the cylinder intake air quantity, being a value representing engine load.

Then in step 2, it is judged if predetermined diagnosis permit conditions have materialized.

Preferably a time when the cooling water temperature at start-up is less than a predetermined temperature and a period from OK or NG is judged by the diagnosis control routine as discussed below, until a key switch is switched off, is made a diagnosis inhibit condition. If conditions do not correspond to this inhibit condition, and correspond to a diagnosis region specified beforehand as operating conditions wherein the engine rotational speed Ne, the engine load Tp, and the cooling water temperature TW are within respective predetermined ranges, then it is judged that diagnosis permit conditions have materialized. The diagnosis region is set within a region for carrying out exhaust gas recirculation under normal control conditions.

When judged that diagnosis permit conditions have materialized, control proceeds to step 3 where it is judged if the engine is at a steady operating condition. This steady condition judgment is carried out based on whether or not the time rate of change of at least one parameter of; the engine rotational speed Ne, the engine load Tp, or the throttle valve opening TVO is within a predetermined range.

When judged to be steady, control proceeds to step 4 where data sampling is carried out.

With the data sampling of step 4, cylinder pressure sampling is carried out during the compression stroke before combustion, under conditions wherein the EGR control valve 5 is opened by control of the EGR control solenoid 9 to thereby effect exhaust gas recirculation. This is explained in detail later referring to the flow chart of FIG. 4.

In step 5, cylinder pressure data EIMEP obtained in step 4 is set to EIMEP1 as data for the exhaust gas recirculation ON control condition.

Then in step 6, the EGR control valve 5 is forcibly closed under control of the EGR control solenoid 9, so that exhaust gas recirculation is cut off.

In step 7, it is judged if a predetermined time has elapsed from after exhaust gas recirculation cut-off. Then once stabilized in the exhaust gas recirculation cut-off condition, control proceeds to step 8.

In step 8, cylinder pressure sampling under the exhaust gas recirculation cut-off condition is carried out.

Then in step 9, cylinder pressure data EIMEP obtained in step 8 is set to EIMEP2 as data for the exhaust gas recirculation OFF control condition.

In step 10, control is then carried out so as to restore the exhaust gas recirculation, which has been cut-off for diagnosis, to the normal recirculation quantity.

In step 11, the presence or absence of a fault in the exhaust gas recirculation unit is diagnosed based on the cylinder pressure data EIMEP1, and EIMEP2.

This is explained in detail referring to the flow chart of FIG. 5, and basically includes carrying out diagnosis based on a change in the cylinder pressure during the compression stroke before combustion, due to the presence or absence of exhaust gas recirculation. If the exhaust gas recirculation is actually switched ON and OFF in accordance with the control, then it can be expected that the cylinder pressures EIMEP1 and EIMEP2 will have a difference equal to or greater than a predetermined value based the presence or absence of exhaust gas recirculation. Therefore when a difference equal to or greater than the predetermined value is not indicated, this shows indirectly that the actual exhaust gas recirculation quantity is not being controlled in accordance with the control, due to some fault.

Here if as mentioned above, the cylinder pressure is sampled during the compression stroke before combustion, then any influence from combustion fluctuations can be excluded, thus avoiding a drop in diagnosis accuracy due to combustion fluctuations.

In step 12, it is judged if an OK or NG judgment has been given as the judgment result, and until one of these judgment results is given, the main routine repeats.

The flow chart of FIG. 4 illustrates the data sampling aspects of step 4 and step 8 in the flow chart of FIG. 3, that is to say, the function of the cylinder pressure sampling device.

In the flow chart of FIG. 4, initially in step 21, the output from the crank angle sensor and the output from the cylinder pressure sensor 11 is read.

In step 22, a counter is reset to zero.

In step 23, it is judged if the crank angle is less than 30° before compression top dead centre. If less than 30° BTDC, control proceeds to step 24.

In step 24, the cylinder pressure Pi detected by the cylinder pressure sensor 11 is sampled. Then in step 25, the cylinder pressure Pi sampled in step 24 is successively added, to update an integral value PIE.

In step 26, the counter is counted up to calculate a sampling number for the cylinder pressures Pi.

In step 27, it is judged if the crank angle is less than 20° before compression top dead centre. If less than 20° BTDC, the sampling of the cylinder pressure Pi is terminated, and control proceeds to step 28.

That is to say, with the present embodiment, the cylinder pressure Pi is sampled within the range from 30° BTDC~20° BTDC, and successively added.

In step 28, the integral value PIE is divided by the counter value, to obtain an average value for the cylinder pressure Pi sampled over the range from 30° BTDC~20° BTDC, and this is set for the cylinder pressure data EIMEP.

The construction may be such that the integral value PIE is obtained by sampling the cylinder pressure Pi for each set crank angle within a predetermined crank angle range, and in step 28 the integral value PIE is set as is, for the cylinder pressure data EIMEP.

With the construction as described above wherein the cylinder pressure average value or integral value within a predetermined crank angle range during the compression stroke before combustion is made the cylinder pressure data EIMEP, then even if noise is superimposed on the output from the cylinder pressure sensor 11, this noise can be prevented from having any significant influence on the cylinder pressure data EIMEP. Consequently a drop in diagnosis accuracy due to noise can be suppressed.

The predetermined crank angle range for carrying out cylinder pressure sampling is not limited to 30° BTDC~20° BTDC, but may be appropriately set within a crank angle range wherein the cylinder pressure change due to the presence or absence of exhaust gas recirculation is large.

The flow chart of FIG. 5 illustrates the aspects of the diagnosis judgment of step 11 in the flow chart of FIG. 3, that is to say, the function serving as the diagnosis device.

In the flow chart of FIG. 5, initially in step 31, a difference ΔEIMEP (ΔEIMEP=EIMEP1−EIMEP2) between the cylinder pressure data EIMEP1 (the average value or integral value within a predetermined crank angle range) obtained under the exhaust gas recirculation ON control condition, and the cylinder pressure data EIMEP2 obtained under the exhaust gas recirculation OFF control condition is obtained.

Then in step 32, a target difference ΔEIMEP is computed. The target difference DEIMEP is an estimated value for the difference ΔEIMEP obtained when the exhaust gas recirculation unit is normal. This is obtained based on the cylinder pressure data EIMEP2 obtained when exhaust gas recirculation is OFF, and the exhaust gas recirculation proportion.

Here, the larger the exhaust gas recirculation proportion, the larger the cylinder pressure change due to the forcibly opening/closing of the EGR control valve 5. Moreover, even with the same exhaust gas recirculation proportion, if at this time the cylinder pressure (engine load) is large, then the cylinder pressure change due to the presence or absence of exhaust gas recirculation will be small. Hence, corresponding to the relevant characteristics, the target difference ΔEIMEP is set based on the exhaust gas recirculation proportion and the cylinder pressure data EIMEP2.

In step 33, the average of a value for the difference ΔEIMEP divided by the target difference is computed as an EGR flow quantity reduction proportion DLTPN, $$DLTPN = \frac{1}{n} \Sigma \frac{\Delta EIMEP}{\text{Target value}}$$

That is to say, each time the difference ΔEIMEP is obtained this is divided by the target difference ΔEIMEP for that time to give a standardized value so that influences due to differences in engine load and exhaust gas recirculation proportion when obtaining the difference ΔEIMEP are excluded, and an average for the standardized value is then obtained.

In step 34, a judgment value (NG judgment value or OK judgment value) for the EGR flow quantity reduction proportion DLTPN is set corresponding to the sample number n of the difference ΔEIMEP at the time of obtaining the EGR flow quantity reduction proportion DLTPN. The characteristics of this judgment value setting are given later.

In step 35, it is judged if the EGR flow quantity reduction proportion DLTPN is equal to or less than the NG judgment value. If the DLTPN is equal to or less than the NG judgment value, control proceeds to step 36 where it is judged that a fault in the exhaust gas recirculation unit has occurred, and a judgment signal indicating the occurrence of a fault is output.

That is to say, when the cylinder pressure change during the compression stroke before combustion due to ON and OFF control of the exhaust gas recirculation is small compared to at normal times, then it is judged that the exhaust gas recirculation quantity is not changing in accordance with the control, and the occurrence of a fault is thus judged.

A fault in the exhaust gas recirculation unit may be notified by means of a lamp display or the like, based on the diagnosis signal indicating the occurrence of the fault, after which exhaust gas recirculation control may be stopped.

When judged in step 35 that the DLTPN has exceeded the NG judgment value, control proceeds to step 37 where it is judged if the DLTPN is equal to or greater than the OK judgment value.

Here if the DLTPN is equal to or greater than the OK judgment value, control proceeds to step 38 where it is judged that the exhaust gas recirculation unit is normal, and a diagnosis signal indicating normal conditions is output.

If the DLTPN is less than the OK judgment value, that is to say in the case wherein the DLTPN is not small enough to be considered abnormal, but is not large enough to be considered normal, control proceeds to step 39 to defer diagnosis.

Consequently, a range exceeding the NG judgment value but less than the OK judgment value becomes a diagnosis dead zone. In step 34 the OK judgment value is increased and the NG judgment value reduced so that the dead zone is widened the smaller the sample number n for the differences ΔEIMEP when the DLTPN is obtained.

This is so that when the sample number n of the differences ΔEIMEP is small and hence the reliability of the DLTPN is poor, since any final judgment would be premature, then diagnosis apart from when abnormal or normal is clearly perceived is deferred. However when the sample number n is increased so that the reliability of the DLTPN is increased, then the dead zone between the OK judgment value and the NG judgment value is narrowed so that either of the judgment results can be given.

With the present embodiment, the exhaust gas recirculation control valve comprises; the diaphragm type EGR control valve 5 disposed in the exhaust gas recirculation passage 4, and the EGR control solenoid 9 for controlling the introduction of negative engine intake pressure to the valve 5. However, it will be clear that a construction is also possible wherein a solenoid valve is disposed directly in the exhaust gas recirculation passage 4.

Moreover, when the exhaust gas recirculation is forcibly switched ON and OFF for diagnosis, the exhaust gas recirculation quantity may be changed gradually in order to avoid the occurrence of sudden torque fluctuations accompanying the ON and OFF switching.

What is claimed is:

1. A diagnosis apparatus for an exhaust gas recirculation unit of an internal combustion engine wherein a portion of the exhaust gas is recirculated back to an intake system via an exhaust gas recirculation passage in which is disposed an exhaust gas recirculation control valve, said apparatus comprising:

a cylinder pressure sensor for detecting a cylinder pressure of the engine;

cylinder pressure sampling means for sampling the cylinder pressure detected by said cylinder pressure sensor within a pre-set crank angle during a compression stroke; and diagnosis means for outputting a diagnosis signal indicating the presence or absence of a fault in said exhaust gas recirculation unit, based on the cylinder pressure sampled by said cylinder pressure sampling means and an open/close condition of said exhaust gas recirculation control valve for when said cylinder pressure was sampled.

2. A diagnosis apparatus for an exhaust gas recirculation unit of an internal combustion engine according to claim 1, wherein said diagnosis means outputs a diagnosis signal indicating the presence or absence of a fault in said exhaust gas recirculation unit based on a difference between a cylinder pressure sampled with said exhaust gas recirculation control valve open, and a cylinder pressure sampled with said exhaust gas recirculation control valve closed.

3. A diagnosis apparatus for an exhaust gas recirculation unit of an internal combustion engine according to claim 2, wherein said diagnosis means sets an estimation value for said difference based on an exhaust gas recirculation proportion and the cylinder pressure sampled by said cylinder pressure sampling means, and judges a fault in said exhaust gas recirculation unit when said difference is equal to or less than said estimation value, and outputs a diagnosis signal indicating the occurrence of a fault.

4. A diagnosis apparatus for an exhaust gas recirculation unit of an internal combustion engine according to claim 2, wherein said diagnosis means outputs said diagnosis signal to indicate the presence or absence of a fault based on a difference between a cylinder pressure sampled by said cylinder pressure sampling means during said compression stroke with said exhaust gas recirculation control valve open and a cylinder pressure sampled by said cylinder pressure sampling means during said compression stroke with said exhaust gas recirculation control valve closed, thus avoiding an influence of combustion fluctuations on the diagnosis.

5. A diagnosis apparatus for an exhaust gas recirculation unit of an internal combustion engine according to claim 2, wherein said diagnosis means computes an average value of said difference and outputs a diagnosis signal indicating the presence or absence of a fault in said exhaust gas recirculation unit based on said average value.

6. A diagnosis apparatus for an exhaust gas recirculation unit of an internal combustion engine according to claim 5, wherein said diagnosis means changes a dead zone for fault judgment, based on a number of difference data used during computation of said average value.

7. A diagnosis apparatus for an exhaust gas recirculation unit of an internal combustion engine according to claim 1, wherein said diagnosis means outputs said diagnosis signal based only on the cylinder pressure sampled during a compression stroke, thus avoiding an influence of combustion fluctuations on the diagnosis.

8. A diagnosis apparatus for an exhaust gas recirculation unit of an internal combustion engine according to claim 1, wherein said cylinder pressure sampling means samples the cylinder pressure within a range from 30° BTDC~20° BTDC.

9. A diagnosis apparatus for an exhaust gas recirculation unit of an internal combustion engine according to claim 1, wherein said cylinder pressure sampling means computes an average value of the cylinder pressure sampled in a pre-set crank angle range during the compression stroke, and said diagnosis means carries out diagnosis based on said average value of the cylinder pressure.

10. A diagnosis apparatus for an exhaust gas recirculation unit of an internal combustion engine according to claim 1, wherein said cylinder pressure sampling means computes an integral value of the cylinder pressure sampled in a pre-set crank angle range during the compression stroke, and said diagnosis means carries out diagnosis based on said integral value of the cylinder pressure.

11. A diagnosis method for an exhaust gas recirculation unit of an internal combustion engine wherein a portion of the exhaust gas is recirculated to an intake system via an exhaust gas recirculation passage in which is disposed an exhaust gas recirculation control valve, said method including:

sampling the cylinder pressure detected by a cylinder pressure sensor in a pre-set sampling timing during a compression stroke, and outputting a diagnosis signal indicating the presence or absence of a fault in said exhaust gas recirculation unit based on the sampled cylinder pressure and an open/close condition of said exhaust gas recirculation control valve for when said cylinder pressure was sampled.

12. A diagnosis method for an exhaust gas recirculation unit of an internal combustion engine according to claim 11, wherein a diagnosis signal indicating the presence or absence of a fault in said exhaust gas recirculation unit is output based on a difference between a cylinder pressure sampled with said exhaust gas recirculation control valve open, and a cylinder pressure sampled with said exhaust gas recirculation control valve closed.

13. A diagnosis method for an exhaust gas recirculation Unit of an internal combustion engine according to claim 12, wherein an estimation value for said difference is set based on an exhaust gas recirculation proportion, and said sampled cylinder pressure, a fault in said exhaust gas recirculation unit is judged when said difference is equal to or less than said estimation value, and a diagnosis signal indicating the occurrence of a fault is output.

14. A diagnosis method for an exhaust gas recirculation unit of an internal combustion engine according to claim 12, wherein said step of outputting a diagnosis signal comprises outputting said diagnosis signal to indicate the presence or absence of a fault based on a difference between a cylinder pressure sampled during said compression stroke with said exhaust gas recirculation control valve open and a cylinder pressure sampled during said compression stroke with said exhaust gas recirculation control valve closed, thus avoiding an influence of combustion fluctuations on the diagnosis.

15. A diagnosis method for an exhaust gas recirculation unit of an internal combustion engine according to claim 12, wherein an average value of said difference is computed and a diagnosis signal indicating the presence or absence of a fault in said exhaust gas recirculation unit is output based on said average value.

16. A diagnosis method for an exhaust gas recirculation unit of an internal combustion engine according to claim 15, wherein a dead zone for fault judgment is changed, based on a number of difference data used during computation of said average value.

17. A diagnosis method for an exhaust gas recirculation unit of an internal combustion engine according to claim 11, wherein said step of outputting a diagnosis signal comprises outputting said diagnosis signal based only on the cylinder pressure sampled during a compression stroke, thus avoiding an influence of combustion fluctuations on the diagnosis.

18. A diagnosis method for an exhaust gas recirculation unit of an internal combustion engine according to claim 11, wherein the cylinder pressure is sampled within a range from 30° BTDC~20° BTDC.

19. A diagnosis method for an exhaust gas recirculation unit of an internal combustion engine according to claim 11, wherein an average value of the cylinder pressure sampled in a pre-set crank angle range during the compression stroke is computed, and diagnosis based on said average value of the cylinder pressure is carried out.

20. A diagnosis method for an exhaust gas recirculation unit of an internal combustion engine according to claim 11, wherein an integral value of the cylinder pressure sampled in a pre-set crank angle range during the compression stroke is computed, and diagnosis based on said integral value of the cylinder pressure is carried out.

* * * * *